(12) United States Patent
Ding et al.

(10) Patent No.: US 12,204,219 B2
(45) Date of Patent: Jan. 21, 2025

(54) DISPLAY SUBSTRATE AND DISPLAY DEVICE

(71) Applicants: ORDOS YUANSHENG OPTOELECTRONICS CO., LTD., Inner Mongolia (CN); BOE Technology Group Co., Ltd., Beijing (CN)

(72) Inventors: Aiyu Ding, Beijing (CN); Jianyun Xie, Beijing (CN); Jingyi Xu, Beijing (CN); Yongqiang Zhang, Beijing (CN); Xize Chang, Beijing (CN); Wanzhi Chen, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/021,943

(22) PCT Filed: Apr. 28, 2022

(86) PCT No.: PCT/CN2022/089826
§ 371 (c)(1),
(2) Date: Feb. 17, 2023

(87) PCT Pub. No.: WO2023/206220
PCT Pub. Date: Feb. 11, 2023

(65) Prior Publication Data
US 2024/0272499 A1    Aug. 15, 2024

(51) Int. Cl.
G02F 1/1362    (2006.01)
G02F 1/1339    (2006.01)
G02F 1/1368    (2006.01)

(52) U.S. Cl.
CPC ...... *G02F 1/136286* (2013.01); *G02F 1/1339* (2013.01); *G02F 1/136209* (2013.01); *G02F 1/136222* (2021.01); *G02F 1/1368* (2013.01)

(58) Field of Classification Search
CPC .................................................. G02F 1/1362
See application file for complete search history.

(56) References Cited

U.S. PATENT DOCUMENTS

| | | | | |
|---|---|---|---|---|
| 2013/0070002 A1* | 3/2013 | Hisada | ............... | G09G 5/10 362/231 |
| 2013/0088681 A1* | 4/2013 | Hisada | ............ | G02F 1/134336 349/144 |

(Continued)

FOREIGN PATENT DOCUMENTS

| | | |
|---|---|---|
| CN | 203117614 U | 8/2013 |
| CN | 103426369 A | 12/2013 |

(Continued)

*Primary Examiner* — Sang V Nguyen
(74) *Attorney, Agent, or Firm* — WHDA, LLP

(57) ABSTRACT

The present disclosure provides a display substrate and a display device. The display substrate includes a plurality of pixel regions, and each pixel region corresponds to a pixel. Each pixel region includes sub-regions in at least two rows, the sub-regions in each row include at least two sub-regions, a part of the sub-regions in each pixel region correspond to the sub-pixels of the pixel, and at least one sub-region is an opaque region.

15 Claims, 7 Drawing Sheets

(56) References Cited

U.S. PATENT DOCUMENTS

| | | | | |
|---|---|---|---|---|
| 2013/0222747 A1* | 8/2013 | Hisada | ............... | G02F 1/13439 |
| | | | | 349/139 |
| 2015/0205160 A1* | 7/2015 | Kim | ................. | G02F 1/133512 |
| | | | | 349/110 |
| 2017/0299910 A1* | 10/2017 | Sugiyama | ......... | G02F 1/133512 |
| 2018/0341141 A1* | 11/2018 | Lin | ................... | G02F 1/133514 |
| 2020/0012139 A1* | 1/2020 | Peng | ................. | G02F 1/133514 |

FOREIGN PATENT DOCUMENTS

| | | | | | |
|---|---|---|---|---|---|
| CN | 106681062 | A | 5/2017 | | |
| CN | 107219700 | * | 9/2017 | ........... | G02F 1/1343 |
| CN | 107219700 | A | 9/2017 | | |
| CN | 108445681 | * | 8/2018 | ........... | G02F 1/1362 |
| CN | 111443514 | A | 7/2020 | | |
| JP | 2010-286524 | A | 12/2010 | | |

\* cited by examiner

DISPLAY SUBSTRATE AND DISPLAY DEVICE

CROSS-REFERENCE TO RELATED APPLICATION

The present disclosure is a National Stage of International Application No. PCT/CN2022/089826, filed on Apr. 28, 2022, with the title of "DISPLAY SUBSTRATE AND DISPLAY DEVICE", which is incorporated herein in its entirety by reference.

TECHNICAL FIELD

The present disclosure relates to the field of display technology, in particular to a display substrate and a display device.

BACKGROUND

In the related art, usually sub-pixels of a pixel in a liquid crystal display device are arranged in a row along a specific direction. A photo spacer needs to be arranged between an array substrate and a color film substrate, and a certain aperture area is occupied by the photo spacer, so a display effect of the display device is adversely affected.

SUMMARY

In a first aspect, the present disclosure provides in some embodiments a display substrate, including a plurality of pixel regions each corresponding to a pixel. Each pixel region includes sub-regions in at least two rows, the sub-regions in each row include at least two sub-regions, a part of the sub-regions in each pixel region correspond to sub-pixels of the pixel, and at least one of the sub-regions is an opaque region.

In a possible embodiment of the present disclosure, the pixel region includes four sub-regions, three of the four sub-regions correspond to the sub-pixels in different colors, the other one of the four sub-regions is the opaque region, and the four sub-regions are arranged in two rows and two columns.

In a possible embodiment of the present disclosure, three of the four sub-regions correspond to a red sub-pixel, a blue sub-pixel and a green sub-pixel respectively. The sub-region corresponding to the red sub-pixel and the sub-region corresponding to the green sub-pixel are located in a same row, the sub-region corresponding to the red sub-pixel and the sub-region corresponding to the blue sub-pixel are located in a same column, and the opaque region and the sub-region corresponding to the green sub-pixel are located in a same column.

In a possible embodiment of the present disclosure, the sub-regions corresponding to the sub-pixels in a same color are located at a same relative position in the pixel regions, and the opaque regions are located at a same relative position in the pixel regions.

In a possible embodiment of the present disclosure, the sub-regions in each pixel region have a same shape and a same size.

In a possible embodiment of the present disclosure, the display substrate is a color film substrate, the color film substrate includes a first base substrate, and a black matrix and a color film layer arranged on the first base substrate, an orthogonal projection of the black matrix onto the first base substrate covers an orthogonal projection of the opaque region onto the first base substrate, and an orthogonal projection of the color film layer onto the first base substrate covers an orthogonal projection of the sub-region corresponding to the sub-pixel onto the first base substrate.

In a possible embodiment of the present disclosure, the display substrate is an array substrate, the array substrate includes a second base substrate, and a driving circuitry layer, a color film layer and a black matrix laminated one on another on the second base substrate, an orthogonal projection of the black matrix onto the second base substrate covers an orthogonal projection of the opaque region onto the second base substrate, and an orthogonal projection of the color film layer onto the second base substrate covers an orthogonal projection of the sub-region corresponding to the sub-pixel onto the second base substrate.

In a possible embodiment of the present disclosure, the display substrate includes a base substrate and a photo spacer arranged on the base substrate, and an orthogonal projection of the photo spacer onto the base substrate is located within an orthogonal projection of the opaque region onto the substrate.

In a possible embodiment of the present disclosure, the photo spacer is arranged in the opaque regions of a part of or all of the pixel regions.

In a possible embodiment of the present disclosure, the display substrate is an array substrate, and the photo spacer is arranged on the array substrate; or the display substrate is a color film substrate, and the photo spacer is arranged on the color film substrate.

In a possible embodiment of the present disclosure, the display substrate is an array substrate, and the array substrate includes a second base substrate and a plurality of scanning lines, a plurality of data lines and a pixel driving circuitry arranged on the second base substrate. The plurality of scanning lines extends along a first direction and is arranged along a second direction on the second base substrate, the plurality of data lines extends along the second direction and is arranged along the first direction on the second base substrate, and the first direction intersects the second direction. The pixel driving circuitry is electrically coupled to the scanning line and the data line, the pixel driving circuitry includes a sub-pixel driving circuitry corresponding to each sub-pixel, the sub-pixel driving circuitry is configured to drive a corresponding sub-pixel, and the scanning lines, or the data lines, or the scanning lines and the data lines, coupled to the sub-pixel driving circuitry corresponding to the sub-pixels in different colors in each pixel are different.

In a possible embodiment of the present disclosure, the sub-pixels in each pixel correspond to a same scanning line and different data lines.

In a possible embodiment of the present disclosure, the pixel region corresponding to each pixel includes four sub-regions arranged in two rows and two columns, three of the four sub-regions correspond to the sub-pixels in different colors respectively, and the other one of the four sub-regions is the opaque region. Three data lines correspond to each pixel, and the three data lines include a first data line, a second data line, and a third data line. The first data line is located at an edge of the pixel region away from the opaque region along the first direction, the second data line is located at an edge of the pixel region close to the opaque region along the first direction, and the third data line is located in the middle of the pixel region along the first direction and at a side close to the opaque region.

In a possible embodiment of the present disclosure, an orthogonal projection of the opaque region onto the second base substrate overlaps with orthogonal projections of the second data line and the third data line onto the second base substrate, and the orthogonal projection of the opaque region onto the second base substrate overlaps with an orthogonal projection of the first data line for the pixel regions in a next column in the first direction onto the second base substrate.

In a possible embodiment of the present disclosure, one scanning line corresponds to each pixel, and the scanning line is located in the middle of the pixel region and at a side close to the opaque region.

In a possible embodiment of the present disclosure, the scanning line includes a first portion extending along the first direction and a second portion, an end of the second portion is coupled to the first portion, the other end of the second portion extends to a side of the pixel region close to the opaque region along the second direction, and the second portion is used as a gate electrode of a thin film transistor of a sub-pixel in a same row as the opaque region along the first direction.

In a possible embodiment of the present disclosure, the orthogonal projection of the opaque region onto the second base substrate overlaps with an orthogonal projection of the first portion onto the second base substrate and an orthogonal projection of the second portion onto the second base substrate.

In a possible embodiment of the present disclosure, at least a part of sub-pixels in each pixel correspond to a same scanning line, and the sub-pixels corresponding to the same scanning line correspond to different data lines. At least a part of sub-pixels in each pixel correspond to a same data line, and the sub-pixels corresponding to the same data line correspond to different scanning lines.

In a possible embodiment of the present disclosure, each pixel includes a sub-pixel in a first color, a sub-pixel in a second color, and a sub-pixel in a third color. The sub-pixel in the first color and the sub-pixel in the second color correspond to a same scanning line and different data lines. The sub-pixel in the first color and the sub-pixel in the third color correspond to a same data line and different scanning lines.

In a possible embodiment of the present disclosure, the sub-pixel in the first color is a red sub-pixel, the sub-pixel in the second color is a green sub-pixel, and the sub-pixel in the third color is a blue sub-pixel.

In a possible embodiment of the present disclosure, the pixel region corresponding to each pixel includes four sub-regions arranged in two rows and two columns, three of the four sub-regions correspond to the sub-pixels in different colors respectively, and the other one of the four sub-regions is the opaque region. The data lines include a fourth data line corresponding to the sub-pixel in the first color and the sub-pixel in the third color, and a fifth data line corresponding to the sub-pixel in the second color. The fourth data line is located at a side of the pixel region away from the opaque region along the first direction, and the fifth data line is located in a central region of the pixel region.

In a possible embodiment of the present disclosure, the orthogonal projection of the opaque region onto the second base substrate overlaps with an orthogonal projection of the fourth data line onto the second base substrate, and overlaps with an orthogonal projection of the fifth data line for the pixel regions in a next column onto the second base substrate along the first direction.

In a possible embodiment of the present disclosure, the scanning lines include a first scanning line corresponding to the sub-pixel in the first color and the sub-pixel in the second color, and a second scanning line corresponding to the sub-pixel in the third color. The first scanning line is located in the middle of the pixel region and at a side close to the opaque region along the second direction, and the second scanning line is located at an edge of the pixel region close to the opaque region.

In a possible embodiment of the present disclosure, the orthogonal projection of the opaque region onto the second base substrate overlaps with an orthogonal projection of the second scanning line onto the second base substrate, and the orthogonal projection of the opaque region onto the second base substrate does not overlap with an orthogonal projection of the first scanning line for the pixel regions in a next row onto the second base substrate along the second direction.

In a second aspect, the present disclosure provides in some embodiments a display device including the above-mentioned display substrate and an opposite substrate corresponding to the display substrate.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Such words as "first" and "second" involved in the specification and the appended claims are merely used to differentiate different objects rather than to represent any specific order. In addition, such words as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. In addition, the expression "and/or" in the description and the appended claims is merely used to represent at least one of the objects before and after the expression. For example, "A and/or B and/or C" represents seven situations, i.e., there is only A, there is only B, there is only C, there are both A and B, there are both B and C, thereby are both A and C, and there are A, B and C.

The present disclosure provides in some embodiments a display substrate.

Figure 1:
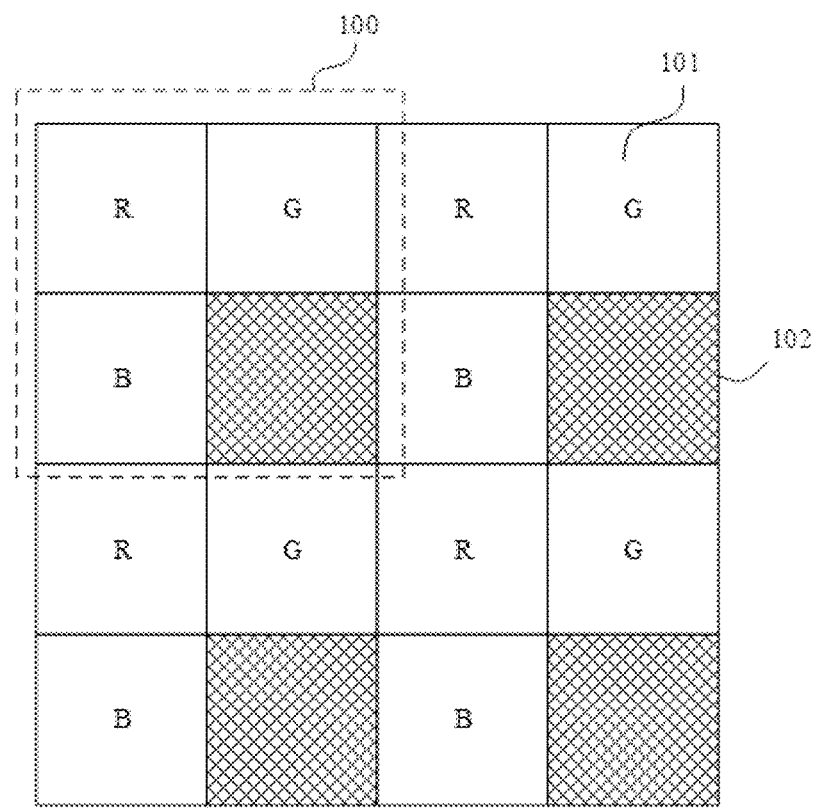
FIG. 1 is a schematic view showing the arrangement of pixels in a display substrate according to one embodiment of the present disclosure.

As shown in FIG. 1, in a possible embodiment of the present disclosure, the display substrate includes a plurality of pixel regions, and each pixel region corresponds to a pixel.

Each pixel region includes sub-regions in at least two rows, and the sub-regions in each row include at least two sub-regions. Illustratively, each pixel region includes the sub-regions arranged in two, three or more rows, and the sub-regions in each row include two, three or more sub-regions.

A shape of each sub-region is set according to the practical need, e.g., each sub-region is of a rectangular, diamond or square shape.

In a possible embodiment of the present disclosure, each sub-region is of a rectangular shape, so as to make full use of space of the display panel.

Each pixel includes a plurality of sub-pixels. In general, the sub-pixels are in different colors. In a possible embodiment of the present disclosure, one pixel includes a red sub-pixel, a green sub-pixel and a blue sub-pixel. During the implementation, the quantity and colors of the sub-pixels may be adjusted according to the practical needs, which will not be particularly defined herein.

A part of the sub-regions in each pixel region correspond to the sub-pixels of the pixel, and at least one of the sub-regions is an opaque region.

In the embodiments of the present disclosure, a Photo Spacer (PS) 303 is arranged at the opaque region, so as to reduce an occupied area of an aperture region, thereby to prevent a display effect from being adversely affected.

In some embodiments of the present disclosure, the display substrate includes a base substrate and the photo spacer 303 arranged on the substrate, and an orthogonal projection of the photo spacer 303 onto the base substrate is located within an orthogonal projection of the opaque region onto the substrate, so as to prevent the photo spacer 303 from occupying the aperture region, thereby to prevent the display effect from being adversely affected.

It should be appreciated that, the base substrate in the embodiments of the present disclosure refers to a first base substrate of a color film substrate or a second base substrate of an array substrate. The first base substrate is parallel to the second base substrate, so relative positions of the orthogonal projection of each structure onto the first base substrate and the second base substrate are the same.

In some embodiments of the present disclosure, the photo spacer 303 is provided in the opaque regions of a part of or all of the pixel regions.

In the embodiments of the present disclosure, the quantity of photo spacers 303 is set according to the practical needs. Illustratively, the photo spacer 303 is provided in each pixel region, or the photo spacers 303 are provided at intervals.

The photo spacers 303 have a same structure or different structures. Illustratively, a plurality of pixel regions is taken as one group, and one primary photo spacer and a plurality of secondary photo spacers are provided in the opaque regions of each group of pixel regions.

Figure 3:
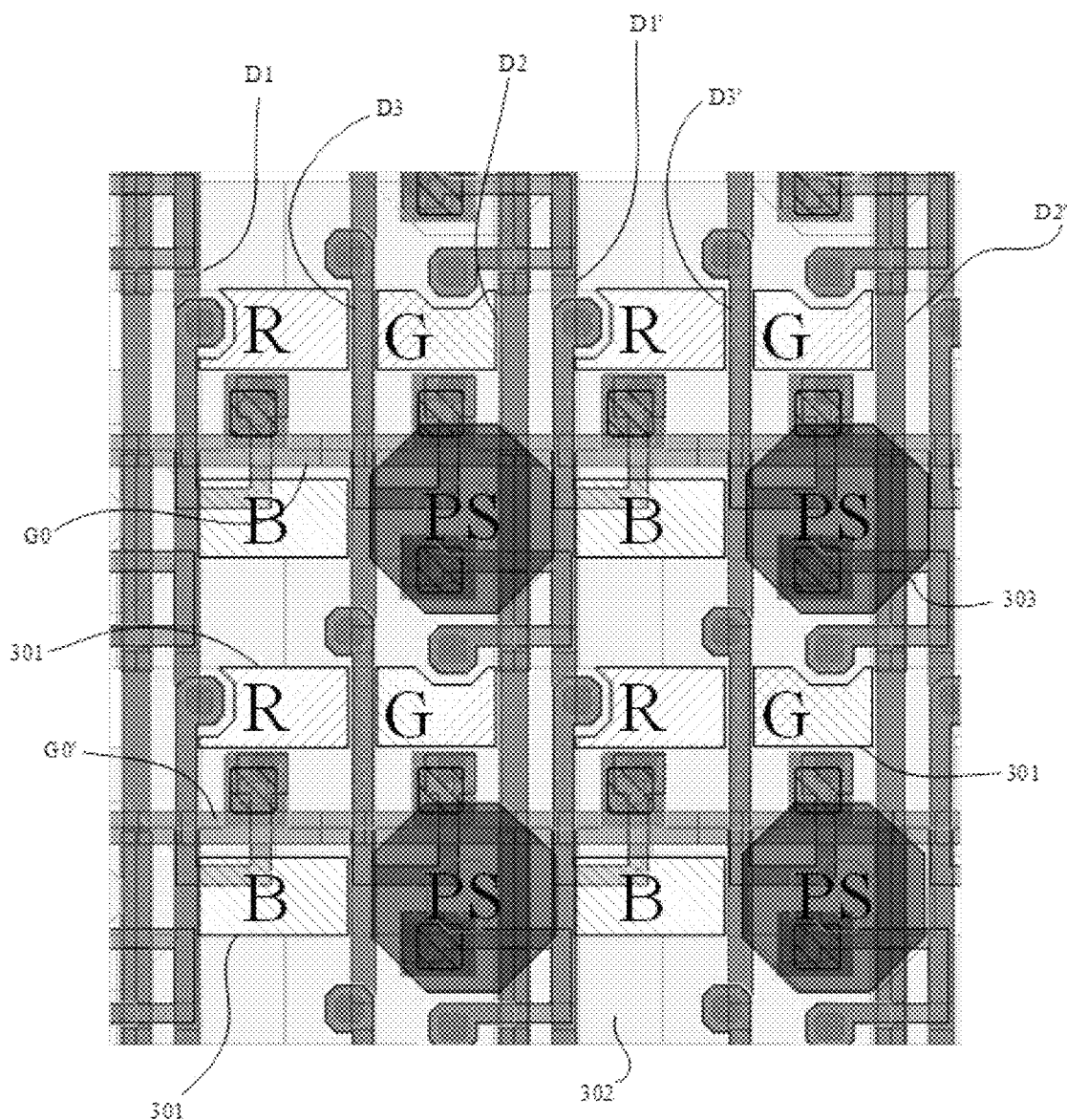
FIG. 3 is a schematic view showing the display substrate according to one embodiment of the present disclosure.
Figure 7:
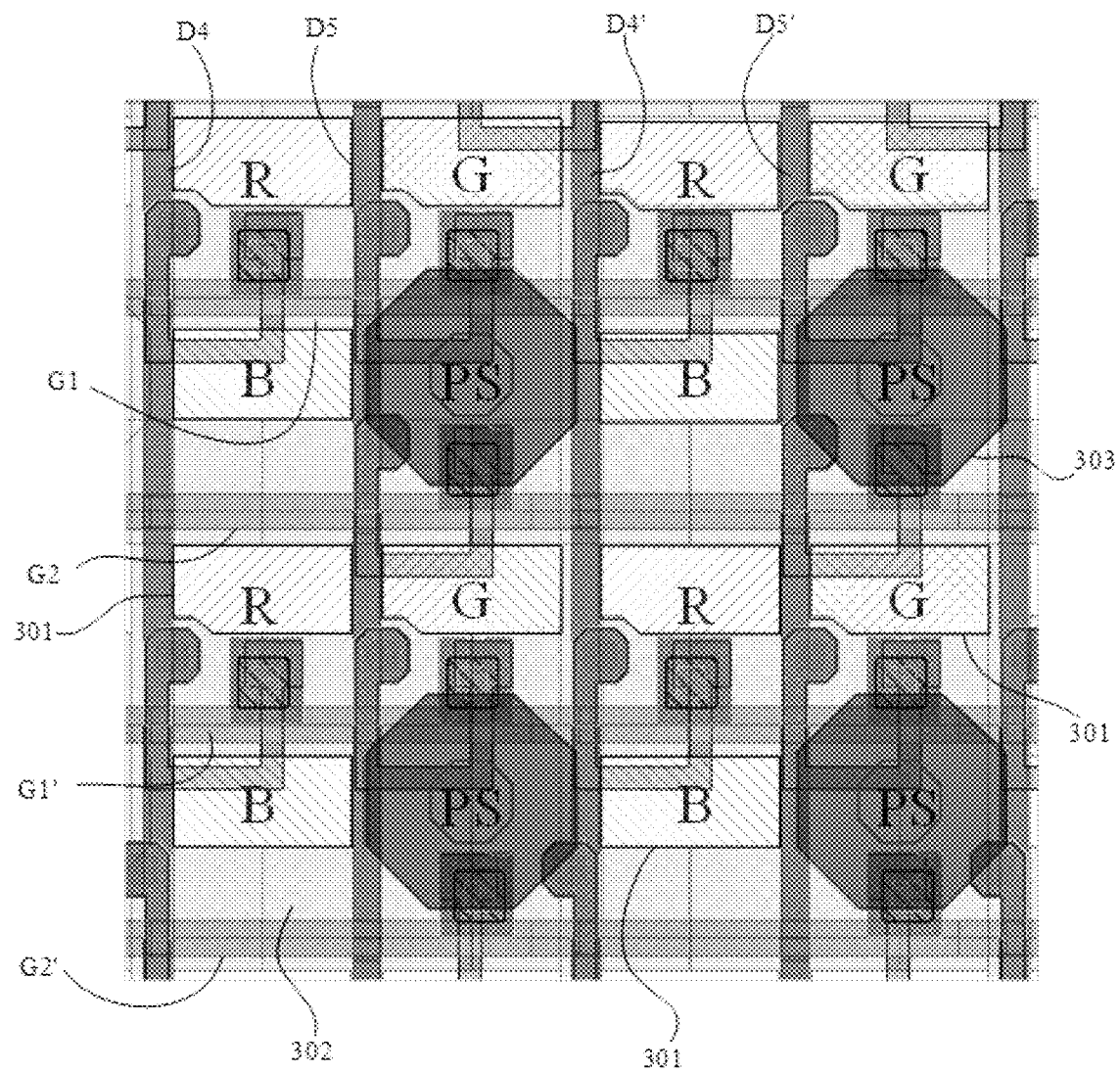
FIG. 7 is another schematic view showing the display substrate according to one embodiment of the present disclosure.

As shown in FIGS. 3 and 7, in a possible embodiment of the present disclosure, the photo spacer 303 is of a generally regular octagonal shape. Obviously, the shape of the photo spacer 303 may be adjusted, such as round, square or oval.

In some embodiments of the present disclosure, the display substrate is an array substrate, and the photo spacer 303 is provided on the array substrate; or the display substrate is a color film substrate, and the photo spacer 303 is provided on the color film substrate. In some other embodiments of the present disclosure, obviously, a plurality of photo spacers 303 may also be provided on both the color film substrate and the array substrate.

Through adjusting the positions and the arrangement modes of the photo spacers 303, it is able to improve the uniformity of the photo spacers 303, thereby to improve the display effect.

In some embodiments of the present disclosure, each pixel region includes four sub-regions arranged in two rows and two columns. Three of the four sub-regions correspond to the sub-pixels in different colors, and the other one of the four sub-regions is the opaque region.

In the case that one pixel includes a red sub-pixel, a green sub-pixel and a blue sub-pixel, three of the four sub-regions correspond to the red sub-pixel, the blue sub-pixel and the green sub-pixel respectively, and the other sub-region is the opaque region.

As shown in FIG. 1, FIG. 3, FIG. 4, and FIG. 6, in the embodiments of the present disclosure, R represents a sub-region corresponding to the red sub-pixel, G represents a sub-region corresponding to the green sub-pixel, B represents a sub-region corresponding to the blue sub-pixel, and PS represents a region corresponding to the photo spacer 303 and the opaque region.

Figure 2:
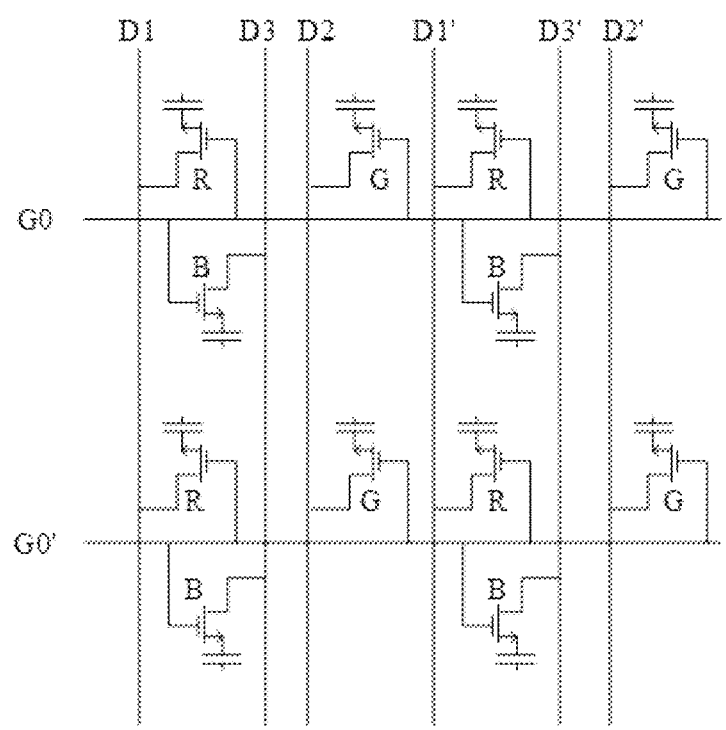
FIG. 2 is a schematic view showing a pixel circuitry of the display substrate according to one embodiment of the present disclosure.
Figure 5:
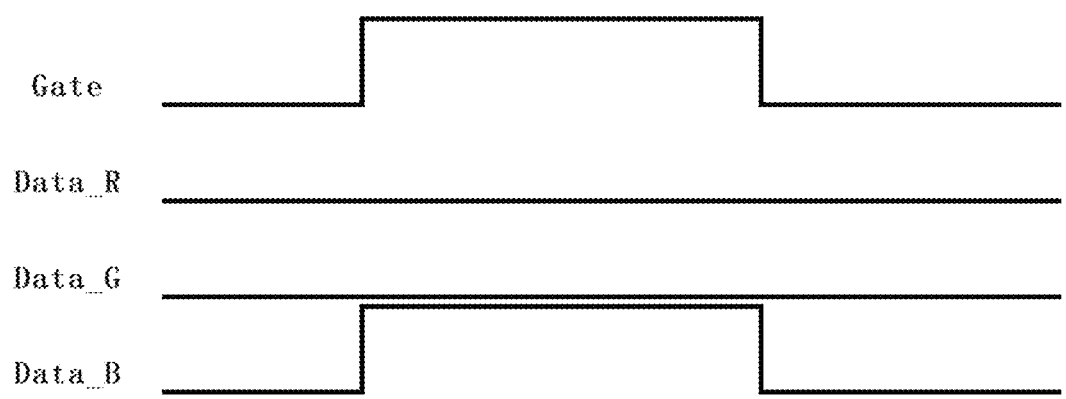
FIG. 5 is a driving sequence diagram of the pixel circuitry in FIG. 2.

Further, as shown in FIGS. 2 and 5, in the circuit diagram, R represents a sub-pixel driving circuitry corresponding to the red sub-pixel, G represents a sub-pixel driving circuitry corresponding to the green sub-pixel, and B represents a sub-pixel driving circuitry corresponding to the blue sub-pixel.

It should be appreciated that, in the case that the display substrate is placed in a certain way, the relative positions of the sub-regions may be adjusted. To be specific, the sub-regions and the opaque region are arranged at an upper left corner, a lower left corner, an upper right corner and a lower right corner of the pixel region respectively, i.e., there are totally 24 arrangement modes for the four sub-regions.

In a possible embodiment of the present disclosure, the sub-region corresponding to the red sub-pixel and the sub-region corresponding to the green sub-pixel are located in a same row, the sub-region corresponding to the red sub-pixel and the sub-region corresponding to the blue sub-pixel are located in a same column, and the opaque region and the sub-region corresponding to the green sub-pixel are located in a same column.

More specifically, in the embodiments of the present disclosure, in a direction as shown in FIG. 1, the sub-region corresponding to the red sub-pixel is located at the upper left corner, the sub-region corresponding to the green sub-pixel is located at the upper right corner, the sub-region corresponding to the blue sub-pixel is located at the lower left corner, and the opaque region is located at the lower right corner.

The above description is merely for illustrative purposes, and when the positions of the sub-regions change, the structures may be adjusted accordingly.

In some embodiments of the present disclosure, the relative positions of the sub-regions corresponding to the sub-pixels in a same color are the same in each pixel region, and the relative positions of the opaque regions are the same in each pixel region.

In the embodiments of the present disclosure, the relative position of the sub-region in each pixel region refers to a position of the corresponding sub-region in each pixel region. Illustratively, in the case that the sub-region corresponding to the red sub-pixel is located at the upper left corner in FIG. 1, the sub-regions corresponding to the red sub-pixel in the pixel regions are all located at the upper left corner, so as to ensure the uniformity of the display device as a whole.

In some embodiments of the present disclosure, the sub-regions in each pixel region have a same shape and a same size. As shown in FIG. 1, in the embodiments of the present disclosure, the sub-regions are of a rectangular shape and have a same size.

In some embodiments of the present disclosure, as shown in FIGS. 3 and 7, the display substrate further includes a black matrix 302, a non-aperture region of each sub-region corresponding to the sub-pixel is covered by the black matrix 302. Further, the black matrix 302 covers the opaque regions of a plurality of sub-regions in each pixel region.

In some embodiments of the present disclosure, the display substrate is a color film substrate, and the color film substrate includes a first base substrate, and a black matrix 302 and a color film layer arranged on the first base substrate. An orthogonal projection of the black matrix 302 onto the first base substrate covers an orthogonal projection of the opaque region onto the first base substrate, and an orthogonal projection of the color film layer onto the first base substrate covers an orthogonal projection of the sub-region onto the first base substrate.

In the embodiments of the present disclosure, the color film layer specifically includes color films in different colors corresponding to the sub-pixels in different colors, and illustratively, it includes a red color film, a green color film, and a blue color film. A position of the color film in each color corresponds to the sub-region in a corresponding color, so as to form an aperture region 301 of the display substrate. The black matrix 302 covers the opaque region to form a non-aperture region of the display substrate.

In some other embodiments of the present disclosure, the display substrate is an array substrate, specifically a color film array substrate provided with a color film layer. The array substrate includes a second base substrate, and a driving circuitry layer, a color film layer, and a black matrix 302 laminated one on another on the second base substrate. An orthogonal projection of the black matrix 302 onto the second base substrate coincides with an orthogonal projection of the opaque region onto the second base substrate, and an orthogonal projection of the color film layer onto the second base substrate covers an orthogonal projection of the sub-region onto the second base substrate.

Similar to the arrangement mode of the color film substrate mentioned hereinabove, in the embodiments of the present disclosure, a position of the color film in each color corresponds to the sub-region in a corresponding color.

With reference to FIGS. 3 and 7 again, each sub-region corresponding to the sub-pixel includes the aperture region 301 and the non-aperture region. The non-aperture region is a portion beyond the aperture region 301 in each sub-region.

In the embodiments of the present disclosure, the aperture regions 301 corresponding to the sub-pixels in different colors are shown through different filling modes.

The black matrix 302 further covers the opaque region to form at least a part of the non-aperture regions of the display substrate.

In some embodiments of the present disclosure, all the non-aperture regions of the display substrate include the non-aperture regions of the sub-regions corresponding to the sub-pixels and the opaque regions. In other words, the black matrix 302 covers the entire region except for the aperture region 301.

In some embodiments of the present disclosure, the display substrate is an array substrate, and the array substrate includes a second base substrate, and a plurality of scanning lines, a plurality of data lines and a pixel driving circuitry located on the second base substrate.

The plurality of scanning lines extends along a first direction and is arranged along a second direction on the second base substrate, the plurality of data lines extends along the second direction and is arranged along the first direction on the second base substrate, and the first direction intersects the second direction.

In the embodiments of the present disclosure, the first direction is a horizontal direction, or a row direction, and the second direction is vertical direction, or a column direction, as shown in FIG. 1. It should be appreciated that, the first direction and the second direction are not limited thereto, and the above description is merely for illustrative purposes.

The pixel driving circuitry is electrically coupled to the scanning line and the data line, and it includes a sub-pixel driving circuitry corresponding to the sub-pixel. The sub-pixel driving circuitry is configured to drive a corresponding sub-pixel, and the scanning lines, or the data lines, or the scanning lines and the data lines, coupled to the sub-pixel driving circuitry corresponding to the sub-pixels in different colors in each pixel are different, so as to prevent the occurrence of crosstalk for scanning signals or data signals for different sub-pixels.

It should be appreciated that, the structure of the sub-pixel driving circuitry may be set according to the practical needs, which will not be particularly defined herein. As compared with the related art, the arrangement mode of the sub-pixels in the embodiments of the present disclosure is adjusted, so a connection mode of the sub-pixel driving circuitry with the data line and the scanning line is also adjusted.

As shown in FIG. 2, in some embodiments of the present disclosure, the sub-pixels in each pixel correspond to a same scanning line G0 and different data lines. Here, when the sub-pixel corresponds to the scanning line G0 or the data line, it means that the sub-pixel driving circuitry of the sub-pixel is coupled to the scanning line G0 or the data line to obtain the scanning signal or the data signal.

In some embodiments of the present disclosure, in the case that each pixel region includes four sub-regions as shown in the drawings, one scanning line G0 corresponds to each pixel, and three data lines correspond to each pixel.

It should be appreciated that, the pixels in each row include the sub-pixels in two rows, and the sub-pixel driving circuitries for the sub-pixels in two rows are coupled to the same scanning line G0. The pixels in each column include the sub-pixels in two columns, and the sub-pixel driving circuitries for the sub-pixels in two columns are coupled to three data lines.

As shown in FIGS. 2 and 3, more specifically, the three data lines corresponding to the same pixel include a first data line D1, a second data line D2, and a third data line D3.

As shown in FIG. 3, the first data line D1 is located at an edge of the pixel region away from the opaque region along the first direction, the second data line D2 is located at an edge of the pixel region close to the opaque region along the first direction, and the third data line D3 is located in the middle of the pixel region and at a side close to the opaque region along the first direction.

In the embodiments of the present disclosure, it should be appreciated that, the first data line D1 and the second data line D2 corresponding to a same pixel are respectively located at a left side and a right side of the pixel region corresponding to the pixel, and the third data line D3 is located close to a center of the pixel region.

The sub-pixels in a same color of the pixels in a same column are coupled to a same data line.

With reference to FIG. 3, in the embodiments of the present disclosure, the red sub-pixel and the blue sub-pixel are located in a same column. The sub-pixel driving circuitry for the red sub-pixel is coupled to the first data line D1, and the sub-pixel driving circuitry for the blue sub-pixel is coupled to the second data line D2. The first data line D1 is approximately located at a left side of a column where the red sub-pixel and the blue sub-pixel are located, and the third data line D3 is approximately located at a right side of the where the red sub-pixel and the blue sub-pixel are located.

The sub-pixel driving circuitry for the green sub-pixel is coupled to the second data line D2, and the second data line D2 is approximately located at a right side of a column where the green sub-pixel and the opaque sub-region are located.

In some embodiments of the present disclosure, an orthogonal projection of the opaque region onto the second base substrate overlaps with orthogonal projections of both the second data line D2 and the third data line D3 onto the second base substrate, and overlaps with an orthogonal projection of the first data line D1' for the pixel regions in a next column onto the second base substrate along the first direction.

It should be appreciated that, the first data lines D1 and D1' correspond to the pixels in different columns, the second data lines D2 and D2' correspond to the pixels in different columns, the third data lines D3 and D3' correspond to the pixels in different columns, and the scanning lines G0 and G0' correspond to the pixels in different rows.

In some embodiments of the present disclosure, one scanning line corresponds to each pixel, and the scanning line is located in the middle of the pixel region and at a side close to the opaque region along the second direction.

In the embodiments of the present disclosure, through controlling each scanning line or each data line to overlap with the opaque region as possible, it is able to increase the transmittance of the display substrate, thereby to improve the display effect.

Figure 4:
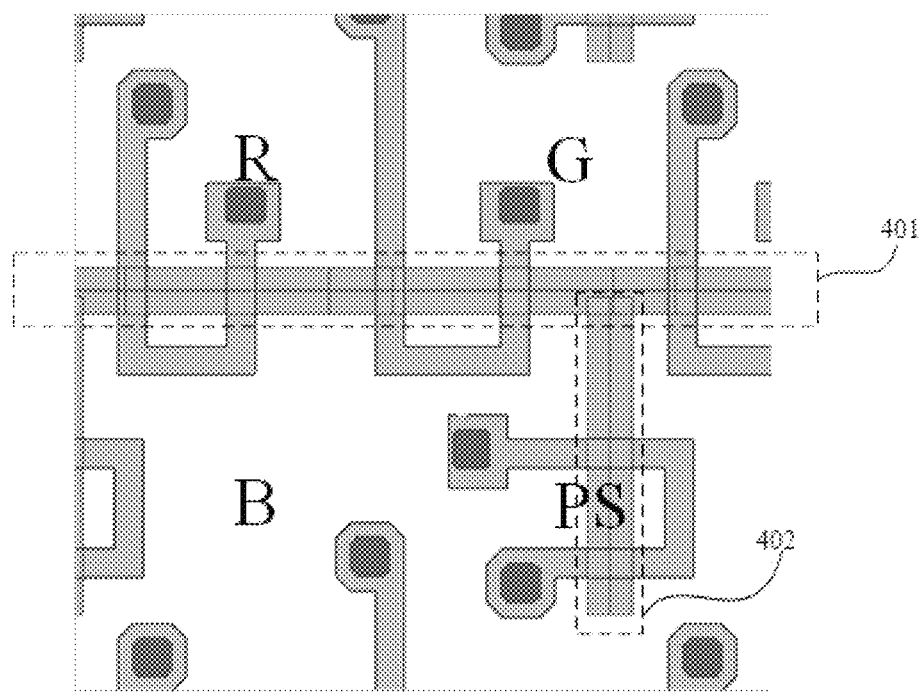
FIG. 4 is a schematic view showing a scanning line of the display substrate according to one embodiment of the present disclosure.

As shown in FIG. 4, in some embodiments of the present disclosure, the scanning line includes a first portion 401 extending along the first direction, and a second portion 402. An end of the second portion 402 is coupled to the first portion 401, the other end of the second portion 402 extends to a side of the pixel region close to the opaque region along the second direction, and the second portion 402 is used as a gate electrode of a thin film transistor of a sub-pixel in a same row as the opaque region along the first direction.

In the embodiments of the present disclosure, a portion of the scanning line corresponding to each pixel is of a substantially T-like shape, and the first portion 401 extending along the first direction may be understood as a main portion of the scanning line.

In the pixel driving circuitries for the red sub-pixel and the green sub-pixel, the first portion 401 is directly taken as a gate electrode (control electrode) of a thin film transistor.

The second portion 402 of the scanning line extending along the second direction may be understood as a protruding branch portion of the scanning line, and the second portion 402 serves as a gate electrode of the thin film transistor of the blue sub-pixel in a same row as the opaque sub-region.

In some embodiments of the present disclosure, the orthogonal projection of the opaque region onto the second base substrate overlaps with an orthogonal projection of the first portion 401 onto the second base substrate and an orthogonal projection of the second portion 402 onto the second base substrate.

Through controlling the orthogonal projections of the first portion 401 and the second portion 402 of the scanning line onto the second base substrate to overlap with the orthogonal projection of the opaque region onto the second base substrate, it is able to increase the transmittance of the display substrate, thereby to improve the display effect.

After adjusting a connection way of the pixel driving circuitry, the driving timing of the display substrate may be adjusted accordingly.

As shown in FIG. 5, when a monochrome image, e.g., a blue image, is to be displayed, the scanning signal is pulled up and maintained for 1H. The red sub-pixel, the blue sub-pixel and the green sub-pixel correspond to different data lines. Hence, switches for the red sub-pixel, the blue sub-pixel and the green sub-pixel are all turned on. Data signals for the red sub-pixel and the green sub-pixel are GND, corresponding to a 0-level grayscale voltage. A data signal for the blue sub-pixel is +5V, corresponding to a 255-level grayscale voltage. In other words, the red sub-pixel, the blue sub-pixel and the green sub-pixel correspond to a same scanning line and different data lines, so during the driving, the sub-pixels are charged simultaneously.

Figure 6:
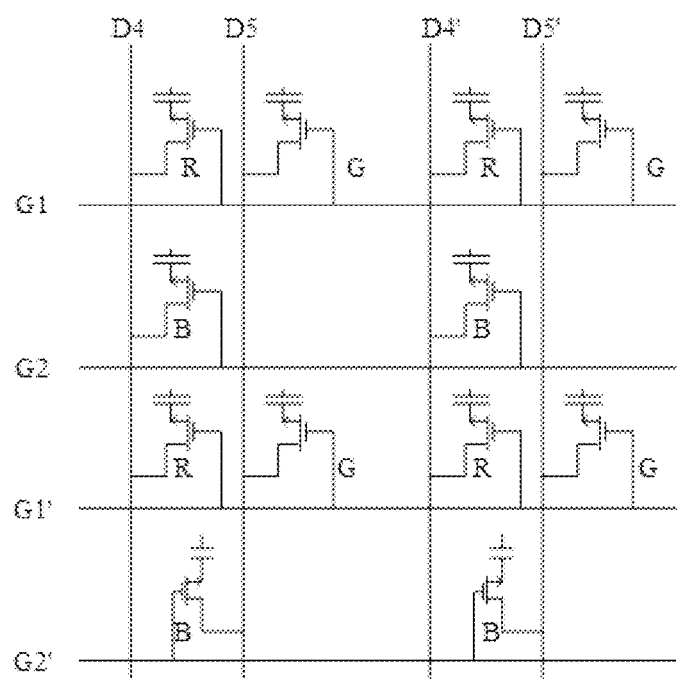
FIG. 6 is another schematic view showing the pixel circuitry of the display substrate according to one embodiment of the present disclosure.

As shown in FIG. 6, in some embodiments of the present disclosure, at least a part of sub-pixels in each pixel correspond to a same scanning line, and the sub-pixels corresponding to the same scanning line correspond to different data lines. At least a part of sub-pixels in each pixel correspond to a same data line, and the sub-pixels corresponding to the same data line correspond to different scanning lines.

It should be appreciated that, for a pixel, if some sub-pixels correspond to a same scanning line, these sub-pixels may correspond to different data lines, and if some sub-pixels correspond to a same data line, these sub-pixels may correspond to different scanning lines. In this way, it is able to prevent the occurrence of crosstalk between the scanning signal from the scanning line and the data signal from the data line.

In some embodiments of the present disclosure, each pixel includes a sub-pixel in a first color, a sub-pixel in a second color, and a sub-pixel in a third color. In some embodiments of the present disclosure, the sub-pixel in the first color is a red sub-pixel, the sub-pixel in the second color is a green sub-pixel, and the sub-pixel in the third color is a blue sub-pixel. Obviously, the sub-pixels are not limited thereto.

In some embodiments of the present disclosure, the sub-pixel in the first color and the sub-pixel in the second color correspond to a same scanning line, and the sub-pixel in the first color and the sub-pixel in the second color correspond to different data lines. The sub-pixel in the first color and the sub-pixel in the third color correspond to a same data line, and the sub-pixel in the first color and the sub-pixel in the third color correspond to different scanning lines.

As shown in FIGS. 6 and 7, in some embodiments of the present disclosure, in the case that the pixel region corresponding to each pixel includes four sub-regions, the data lines include a fourth data line D4 corresponding to the sub-pixel in the first color and the sub-pixel in the third color, and a fifth data line D5 corresponding to the sub-pixel in the second color.

In the embodiments of the present disclosure, specifically, the sub-pixel driving circuitry for the red sub-pixel and the blue sub-pixel located in a same column is coupled to the fourth data line D4, and the sub-pixel driving circuitry for the green sub-pixel located in a same column as the opaque sub-region is coupled to the fifth data line D5.

The fourth data line D4 is located at a side of the pixel region away from the opaque region along the first direction, and the fifth data line D5 is located in the middle of the pixel region.

In some embodiments of the present disclosure, the orthogonal projection of the opaque region onto the second base substrate overlaps with an orthogonal projection of the fourth data line D4 onto the second base substrate, and overlaps with an orthogonal projection of the fifth data line D5' for the pixel regions in a next column onto the second base substrate along the first direction.

Similarly, D4 and D4' represent fourth data lines for the pixels in different columns, and D5 and D5' represent fifth data lines for the pixels in different columns.

In the embodiments of the present disclosure, through controlling the orthogonal projections of the fourth data line D4 and the fifth data line D5 onto the second base substrate to overlap with the orthogonal projection of the opaque region of a current pixel or the other pixel onto the second base substrate, it is able to increase the transmittance of the display substrate.

In some embodiments of the present disclosure, the scanning lines include a first scanning line G1 corresponding to the sub-pixel in the first color and the sub-pixel in the second color, and a second scanning line G2 corresponding to the sub-pixel in the third color.

In the embodiments of the present disclosure, the sub-pixel driving circuitry for the red sub-pixel and the green sub-pixel located in a same row is coupled to the first scanning line G1, and the sub-pixel driving circuitry for the blue sub-pixel located in a same row as the opaque sub-region is coupled to the second scanning line G2.

It should be appreciated that, the blue sub-pixel corresponds to the second scanning line G2, and the green sub-pixel corresponds to the first scanning line G1. Hence, the sub-pixel driving circuitry for the blue sub-pixel may be coupled to the fourth data line D4 or the fifth data line D5.

Further, in some embodiments of the present disclosure, the sub-pixel driving circuitries for a part of the blue sub-pixels are coupled to the fourth data line D4, and the sub-pixel driving circuitries for a part of the blue sub-pixels are coupled to the fifth data line D5.

As shown in FIG. 6, in a possible embodiment of the present disclosure, the sub-pixel driving circuitries for the blue sub-pixels are alternately coupled to the fourth data line D4 and the fifth data line D5 along the second direction.

Along the second direction, the first scanning line G1 is located in the middle of the pixel region and at a side close to the opaque region, and the second scanning line G2 is located at an edge of the pixel region close to the opaque region.

In some embodiments of the present disclosure, the orthogonal projection of the opaque region onto the second base substrate overlaps with an orthogonal projection of the second scanning line G2 onto the second base substrate, and does not overlap with an orthogonal projection of the first scanning line G1' for the pixel regions in a next row onto the second base substrate along the second direction.

Similarly, D1 and D1' represent the first scanning lines for the pixels in different rows, and D2 and D2' represent the second scanning lines for the pixels in different rows.

Figure 8:
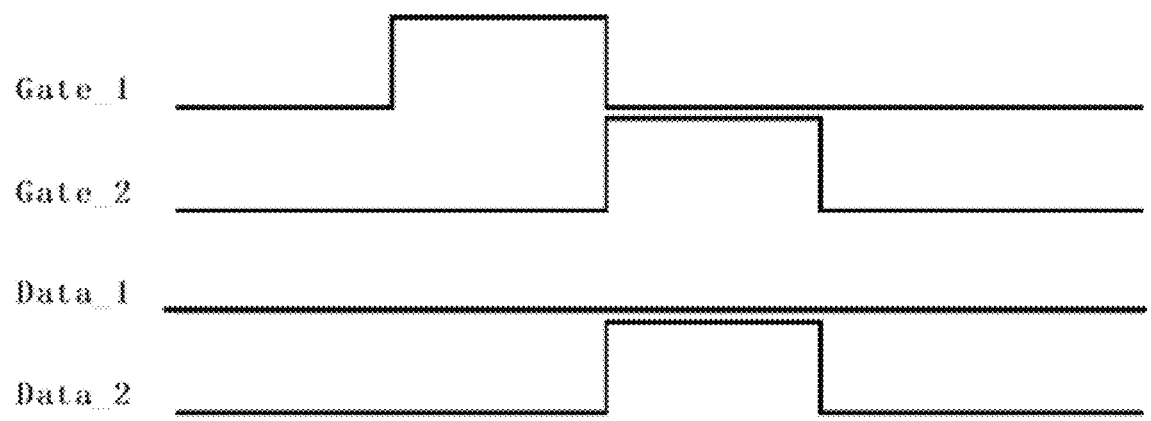
FIG. 8 is a driving sequence diagram of the pixel circuitry in FIG. 6.

As shown in FIG. 8, still taking a monochrome image, e.g., a blue image, as an example, the blue sub-pixel corresponds to the fourth data line D4. The scanning signal from the first scanning line G1 is pulled up for ½ H. At this time, the switches for the red sub-pixel and the green sub-pixel corresponding to the first scanning line G1 are turned on, and the switch for the blue sub-pixel is turned off. The red sub-pixel is charged through the fourth data line D4, the green sub-pixel is charged through the fifth data line D5, and the signals from the fourth data line D4 and the fifth data line D5 are both GND, corresponding to a 0-level grayscale voltage. After the signal from the first scanning line G1 has been pulled up, the signal from the second scanning line G2 is pulled up also for ½ H. At this time, the switches for the red sub-pixel and the green sub-pixel are turned off, and the switch for the blue sub-pixel is turn on. The signal from the fourth data line D4 does not work, i.e., it is still a GND signal. The blue sub-pixel is charged through the fifth data line D5, and the signal from the fifth data line D5 is +5V, corresponding to a 255-level grayscale voltage.

It should be appreciated that, the driving timing of the blue sub-pixel coupled to the fifth data line D5 may be adjusted accordingly.

It should be further appreciated that, in the case of no conflict, the technical solutions in the embodiments of the present disclosure may be combined so as to achieve the technical effect, which will not be particularly defined herein.

The present disclosure further provides in some embodiments a display device including the above-mentioned display substrate and an opposite substrate corresponding to the display substrate.

Illustratively, one of the display substrate and the opposite substrate is a color film substrate, and the other is an array substrate. A liquid crystal layer is further arranged between the display substrate and the opposite substrate. The display device further includes a backlight module.

The display device in the embodiments of the present disclosure include all the technical solutions of the above-mentioned display substrate, so it is also able to at least achieve the above-mentioned technical effects, which will not be particularly defined herein.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display substrate, comprising a plurality of pixel regions each corresponding to a pixel, wherein each pixel region comprises sub-regions in at least two rows, the sub-regions in each row comprise at least two sub-regions, a part of the sub-regions in each pixel region correspond to sub-pixels of the pixel, and at least one of the sub-regions is an opaque region;

wherein the display substrate is an array substrate, and the array substrate comprises a second base substrate and a plurality of scanning lines, a plurality of data lines and a pixel driving circuitry arranged on the second base substrate;

the plurality of scanning lines extends along a first direction and is arranged along a second direction on the second base substrate, the plurality of data lines extends along the second direction and is arranged along the first direction on the second base substrate, and the first direction intersects the second direction; and the pixel driving circuitry is electrically coupled to the scanning line and the data line, the pixel driving circuitry comprises a sub-pixel driving circuitry corresponding to each sub-pixel, the sub-pixel driving circuitry is configured to drive a corresponding sub-pixel, and the scanning lines, or the data lines, or the scanning lines and the data lines, coupled to the sub-pixel driving circuitry corresponding to the sub-pixels in different colors in each pixel are different;

wherein the sub-pixels in each pixel correspond to a same scanning line and different data lines:

wherein the pixel region corresponding to each pixel comprises four sub-regions arranged in two rows and two columns, three of the four sub-regions correspond to the sub-pixels in different colors respectively, and the other one of the four sub-regions is the opaque region;

three data lines correspond to each pixel, and the three data lines comprise a first data line, a second data line, and a third data line; and the first data line is located at an edge of the pixel region away from the opaque region along the first direction, the second data line is located at an edge of the pixel region close to the opaque region along the first direction, and the third data line is located in the middle of the pixel region along the first direction and at a side close to the opaque region;

wherein an orthogonal projection of the opaque region onto the second base substrate overlaps with orthogonal projections of the second data line and the third data line onto the second base substrate, and the orthogonal projection of the opaque region onto the second base substrate overlaps with an orthogonal projection of the first data line for the pixel regions in a next column in the first direction onto the second base substrate;

wherein one scanning line corresponds to each pixel, and the scanning line is located in the middle of the pixel region and at a side close to the opaque region;

wherein the scanning line comprises a first portion extending along the first direction and a second portion, an end of the second portion is coupled to the first portion, the other end of the second portion extends to a side of the pixel region close to the opaque region along the second direction, and the second portion is used as a gate electrode of a thin film transistor of a sub-pixel in a same row as the opaque region along the first direction; and wherein the orthogonal projection of the opaque region onto the second base substrate overlaps with an orthogonal projection of the first portion onto the second base substrate and an orthogonal projection of the second portion onto the second base substrate.

2. The display substrate according to claim 1, wherein the pixel region comprises four sub-regions, three of the four sub-regions correspond to the sub-pixels in different colors, the other one of the four sub-regions is the opaque region, and the four sub-regions are arranged in two rows and two columns.

3. The display substrate according to claim 2, wherein three of the four sub-regions correspond to a red sub-pixel, a blue sub-pixel and a green sub-pixel respectively; and the sub-region corresponding to the red sub-pixel and the sub-region corresponding to the green sub-pixel are located in a same row, the sub-region corresponding to the red sub-pixel and the sub-region corresponding to the blue sub-pixel are located in a same column, and the opaque region and the sub-region corresponding to the green sub-pixel are located in a same column.

4. The display substrate according to claim 1, wherein the sub-regions corresponding to the sub-pixels in a same color are located at a same relative position in the pixel regions, and the opaque regions are located at a same relative position in the pixel regions.

5. The display substrate according to claim 1, wherein the sub-regions in each pixel region have a same shape and a same size.

6. The display substrate according to claim 1, wherein the array substrate comprises a driving circuitry layer, a color film layer and a black matrix laminated one on another on the second base substrate, an orthogonal projection of the black matrix onto the second base substrate covers an orthogonal projection of the opaque region onto the second base substrate, and an orthogonal projection of the color film layer onto the second base substrate covers an orthogonal projection of the sub-region corresponding to the sub-pixel onto the second base substrate.

7. The display substrate of claim 1, wherein the display substrate comprises a base substrate and a photo spacer arranged on the base substrate, and an orthogonal projection of the photo spacer onto the base substrate is located within an orthogonal projection of the opaque region onto the substrate;

wherein the photo spacer is arranged in the opaque regions of a part of or all of the pixel regions.

8. The display substrate according to claim 1, wherein at least a part of sub-pixels in each pixel correspond to a same scanning line, and the sub-pixels corresponding to the same scanning line correspond to different data lines; and at least a part of sub-pixels in each pixel correspond to a same data line, and the sub-pixels corresponding to the same data line correspond to different scanning lines.

9. The display substrate according to claim 8, wherein each pixel comprises a sub-pixel in a first color, a sub-pixel in a second color, and a sub-pixel in a third color;

the sub-pixel in the first color and the sub-pixel in the second color correspond to a same scanning line and different data lines; and the sub-pixel in the first color and the sub-pixel in the third color correspond to a same data line and different scanning lines.

10. The display substrate according to claim 9, wherein the sub-pixel in the first color is a red sub-pixel, the sub-pixel in the second color is a green sub-pixel, and the sub-pixel in the third color is a blue sub-pixel.

11. The display substrate according to claim 9, wherein the pixel region corresponding to each pixel comprises four sub-regions arranged in two rows and two columns, three of the four sub-regions correspond to the sub-pixels in different colors respectively, and the other one of the four sub-regions is the opaque region;

the data lines comprise a fourth data line corresponding to the sub-pixel in the first color and the sub-pixel in the third color, and a fifth data line corresponding to the sub-pixel in the second color; and the fourth data line is located at a side of the pixel region away from the opaque region along the first direction, and the fifth data line is located in a central region of the pixel region.

12. The display substrate according to claim 11, wherein the orthogonal projection of the opaque region onto the second base substrate overlaps with an orthogonal projection of the fourth data line onto the second base substrate, and overlaps with an orthogonal projection of the fifth data line for the pixel regions in a next column onto the second base substrate along the first direction.

13. The display substrate according to claim 11, wherein the scanning lines comprise a first scanning line corresponding to the sub-pixel in the first color and the sub-pixel in the second color, and a second scanning line corresponding to the sub-pixel in the third color; and the first scanning line is located in the middle of the pixel region and at a side close to the opaque region along the second direction, and the second scanning line is located at an edge of the pixel region close to the opaque region.

14. The display substrate according to claim 13, wherein the orthogonal projection of the opaque region onto the second base substrate overlaps with an orthogonal projection of the second scanning line onto the second base substrate, and the orthogonal projection of the opaque region onto the second base substrate does not overlap with an orthogonal projection of the first scanning line for the pixel regions in a next row onto the second base substrate along the second direction.

15. A display device, comprising the display substrate according to claim 1, and an opposite substrate corresponding to the display substrate.

* * * * *